United States Patent [19]

Voorhees

[11] Patent Number: 4,696,714
[45] Date of Patent: Sep. 29, 1987

[54] FOIL APPLICATOR

[76] Inventor: Theodore Voorhees, 331 Greenacres Dr., Anderson, Calif. 96007

[21] Appl. No.: 821,478

[22] Filed: Jan. 22, 1986

[51] Int. Cl.⁴ .................... B31F 1/00; B32B 31/00; B44C 1/00
[52] U.S. Cl. .................... 156/468; 156/477.1; 156/486; 156/495; 156/540; 156/581
[58] Field of Search ............... 156/230, 232, 233, 234, 156/236, 238, 239, 240, 241, 249, 212, 391, 468, 583.1, 582, 581, 540, 477.1, 486, 495

[56] References Cited

U.S. PATENT DOCUMENTS

| | | |
|---|---|---|
| 1,969,660 | 8/1934 | McLaurin . |
| 2,057,061 | 10/1936 | Eggerss . |
| 2,654,687 | 10/1953 | Fridolph . |
| 2,748,046 | 5/1956 | Works et al. . |
| 3,200,029 | 8/1965 | Cross . |
| 3,567,538 | 3/1971 | Lind . |
| 3,607,533 | 9/1971 | Moore . |
| 3,654,016 | 4/1972 | Alexander ............... 156/540 |
| 3,669,793 | 6/1972 | Billings ............... 156/238 |
| 3,698,989 | 10/1972 | Voorhees . |
| 3,994,769 | 11/1976 | Gersbeck . |
| 4,065,333 | 12/1977 | Lawlis et al. . |
| 4,081,304 | 3/1978 | Bruseschi ............... 156/249 |
| 4,118,264 | 10/1978 | Boettcher . |
| 4,247,511 | 1/1981 | Sutton et al. . |
| 4,288,275 | 9/1981 | Davis . |
| 4,302,492 | 11/1981 | Hutter, III ............... 156/234 |
| 4,328,062 | 5/1982 | Off et al. ............... 156/361 |
| 4,373,984 | 2/1983 | Hawkins ............... 156/540 |

Primary Examiner—Donald E. Czaja
Assistant Examiner—L. Falasco
Attorney, Agent, or Firm—Leonard D. Schappert

[57] ABSTRACT

A foil applicator for applying decorative film from transfer foil to contoured edges, contoured serpentine edges and other edges of workpieces.

The applicator includes a transport block having a face of substantially the same contour as the edge of the work piece with a heating means for the transport block, and a hammering means having a face of substantially the same contour as the edge of the work piece and being in close proximity to the transport block.

3 Claims, 9 Drawing Figures

FOIL APPLICATOR

BACKGROUND OF THE INVENTION

1. Field of the Invention

This invention relates generally to apparatus for applying decorative coating or decorative film of a removable transfer foil to wood or other material or workpieces, and specifically to a machine designed to effectively transfer decorative coating or decorative film from a transfer foil to a workpiece having a straight or contoured serpentine edge; that is, an edge having a profile such that its circumference varies from top to bottom and along which a given cross-section of transfer foil must be stretched at different levels of tension in order to eliminate crinkling or creasing of the foil.

2. Description of the Prior Art

In the past, inventors have directed their efforts toward the creation of various devices for applying transfer foil to contoured edges of a substrate. In the cabinet, furniture and interior-finish materials industry, many doors, side panels and other workpieces are presently constructed of materials such as plastics, reconstituted fiberboard, chip board and medium-density fiberboard, and other materials which are less costly than solid or veneered wood. The exposed surfaces of such workpieces are generally finished in such a way that they simulate natural woodgrain finish. In order to attain these characteristics, persons have utilized machines with rollers to apply the desired decorative film of transfer foil to flat, planar surfaces of such workpieces, as well as to contoured edges with relatively simple profiles. While such machines have done a substantially adequate job with speed and precision on planar surfaces and contoured edges, so long as the surface to be covered is not curved, the application of the film of transfer foil to curved contoured edges has continued to be plagued by wrinkles, creases and/or gaps which detract from the appearance of a finished edge and reduce the marketability of the final product.

Applicant is unaware of any prior art which teaches a foil applicator capable of applying a decorative film of transfer foil to a serpentine surface the shape of which requires the same amount of decorative film of transfer foil to extend over varying lengths without crinkling or creasing.

SUMMARY OF THE INVENTION

The present invention consists of a foil applicator which includes a contoured transfer block around which transfer foil is routed, and the contour of which matches the contour of the edge of a workpiece to which the foil is being applied. The transfer block is heated by a thermostatically controlled heater to bring the transfer foil to optimal temperature for application to the surface of a workpiece. As the decorative film of transfer foil is initially bonded to the surface of the workpiece by heat from the transfer block, a contoured rubber hammer which is vibrated against the surface of the workpiece after transfer foil has been applied is utilized to attach the decorative film from the transfer foil more securely to that surface. As a result of its being stretched against the contoured surface of the heated transfer block, the transfer foil takes on the contour of the transfer block, and subsequently the contour of the surface of the workpiece to which the transfer foil is being applied, thereby eliminating wrinkling and creasing of the decorative film of transfer foil. If the contoured surface of the workpiece is serpentine in nature, so that the length of the edge varies from top to bottom and so that a given cross-sectional area of the transfer foil must stretch at different rates in order to eliminate crinkling and creasing, such stretching is accomplished by the use of heat on the transfer block and of the hammer, which securely attaches the decorative film of transfer foil to the workpiece.

One of the objects of the present invention is to provide means for applying decorative film from transfer foil to the edge of a workpiece.

Another object of the present invention is to provide means for applying decorative film from transfer foil to the contoured edge of a workpiece of the outer edge of which follows a serpentine path so that a given length of transfer foil covers the varying lineal distances of the serpentine contoured edge.

Another object of the present invention is to provide means for applying decorative film from transfer foil to a surface where, because of the contour of the surface, the cross-section of a given length of tape is required to stretch at different rates over the contoured edge without crinkling or creasing.

The foregoing objects, as well as other objects and benefits of the present invention, are made more apparent by the descriptions and claims which follow.

BRIEF DESCRIPTION OF THE DRAWINGS

FIGS. 8 and 9 further show the pivoting of the foil applicator mechanism as the workpiece is turned.

DESCRIPTION OF THE PREFERRED EMBODIMENT

The present invention comprises a foil applicator capable of applying transfer foil to a contoured edge of a workpiece, and includes means to facilitate application to a contoured edge of a workpiece having a serpentine shape.

Figure 1:
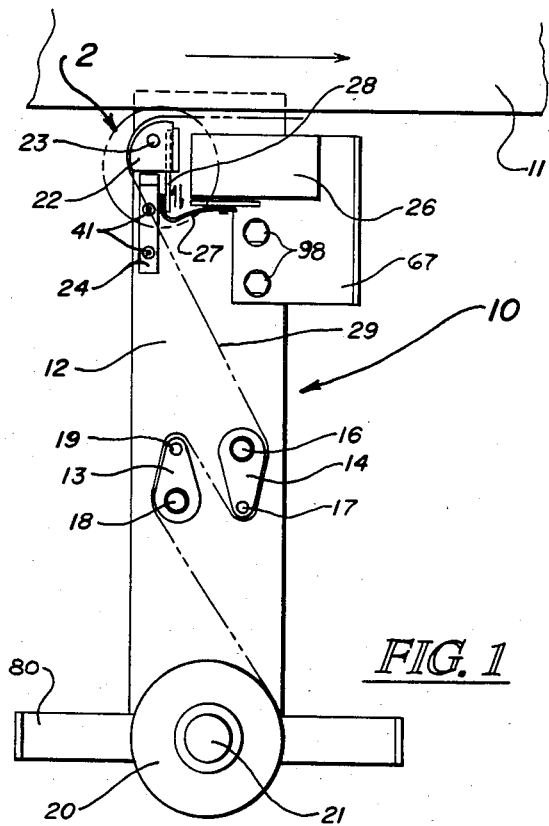
FIG. 1 is a top view showing the layout of the portion of the foil applicator including the transfer foil mechanism and transfer block arrangement against a workpiece.

FIG. 1 is a top view showing the tape applicator mechanism 10 in position to apply decorative film from transfer foil to the edge of workpiece 11. Tape applicator mechanism 10 consists of a base 12 with a roll of transfer foil 20 mounted thereon and with means for transmitting the transfer foil 29 to the edge of workpiece 11. A roll of transfer foil 20 is positioned on roller 21, and transfer foil 29 is routed around friction brake tension means 13 and 14 to transfer block 22 and to the edge of workpiece 11. Friction brake tension means 13 pivots on pivot point 18 and includes roller 19 to facilitate movement of transfer foil 29. Friction brake tension means 14 includes roller 17, which is mounted on pivot point 16 and includes roller 17 to facilitate the movement of transfer foil 29. Transfer block 22 is mounted to bracket 24, which is mounted to base 12 by attaching means 41, which in this embodiment consists of screws or other mounting means. Transfer block 22 is rigidly attached to bracket 24 by screws or other mounting means not specifically shown. A heater 23 is positioned inside hole 72 in transfer block 22 so that it heats transfer block 22. As transfer foil 29 is routed around the edge of transfer block 22, the decorative film on transfer foil 29 is heated, and both the decorative film and the carrier material of transfer foil 29 are stretched to conform to the contoured surface of transfer block 22. The contoured surface of transfer block 22 matches a contoured surface of workpiece 11 to which transfer foil 29 is to be applied. As transfer foil 29 is positioned against the edge of workpiece 11, hammer 28, which is here constructed of rubber and has a contoured edged which also matches the edge of workpiece 11, is vibrated through the use of a solenoid 26, to which an alternating current is applied. Hammer 28 is attached to solenoid 26 by spring metal attaching means 27, which allows for flexibility during vibration. As a result of the vibration of hammer 28 against transfer foil 29 which is being applied to workpiece 11, transfer foil 29 is more securely attached to workpiece 11. Solenoid 26 is attached to base 12 by bracket 67 and screws 98, which hold bracket 67 in position with respect to base 12. Bracket 80 is provided to limit unrolling of transfer foil 29 from roll of transfer foil 20.

Figure 2:
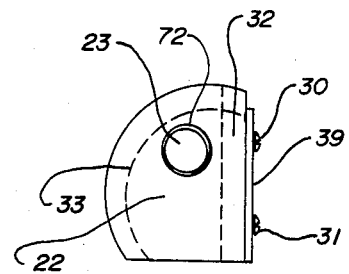
FIG. 2 is a top view showing in detail the transfer block shown in circled area 2 of FIG. 1.
Figure 3:
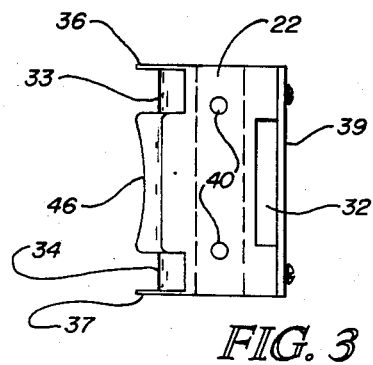
FIG. 3 is an end view of the transfer block shown in FIG. 2.
Figure 4:
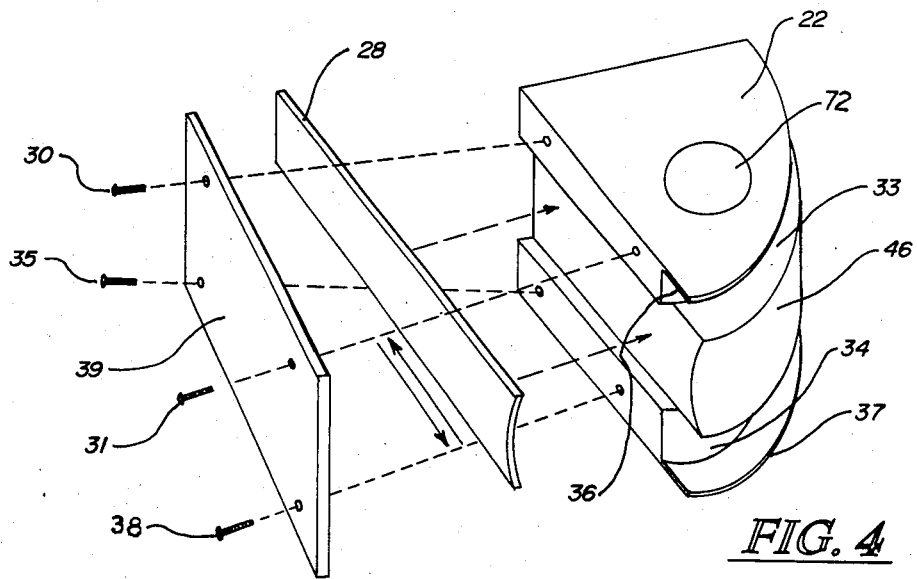
FIG. 4 is a perspective view of the transfer block showing further details of its construction, as well as the hammer which is utilized with the transfer block to apply decorative film from transfer foil.

FIGS. 2 through 4 show the physical construction of transfer block 22 and hammer 28 in greater detail. Transfer block 22 has a hole 72 into which a heater 23 is placed in order to heat the contoured surface 46 of transfer block 22. Slot 32 is provided into which hammer 28 is positioned. Plate 39, which is held in place on transfer block 22 by mounting means 30, 31, 35 and 38, holds hammer 28 in position with respect to transfer block 22. Holes 40 in transfer block 22 are provided to facilitate mounting of transfer block 22 to bracket 24. Slots 33 and 34 are positioned adjacent to contoured surface 46 and, during the slotting process, lips 36 and 37 are created. As a result of the heating of transfer block 22 provided by heater 23 and the tension exerted on transfer foil 29 by friction brake tension means 13 and 14, transfer foil 29 is stretched and takes on the contour of contoured surface 46 of transfer block 22 when it is routed around transfer block 22. Because only that part of transfer foil 29 which is in contact with contoured surface 46 of transfer block 22 is heated, transfer foil 29 is creased where slots 33 and 34 meet contoured surface 46. Because of the uniform heating across contoured surface 46 of transfer block 22, transfer foil 29 stretches to conform to the surface of workpiece 11. The transfer block 22 is designed so that the width of transfer foil 29 being utilized is substantially the same as the distance between lip 36 and lip 37 of transfer block 22, so that transfer foil 29 is guided and held in position on contoured surface 46 of transfer block 22.

Figure 5:
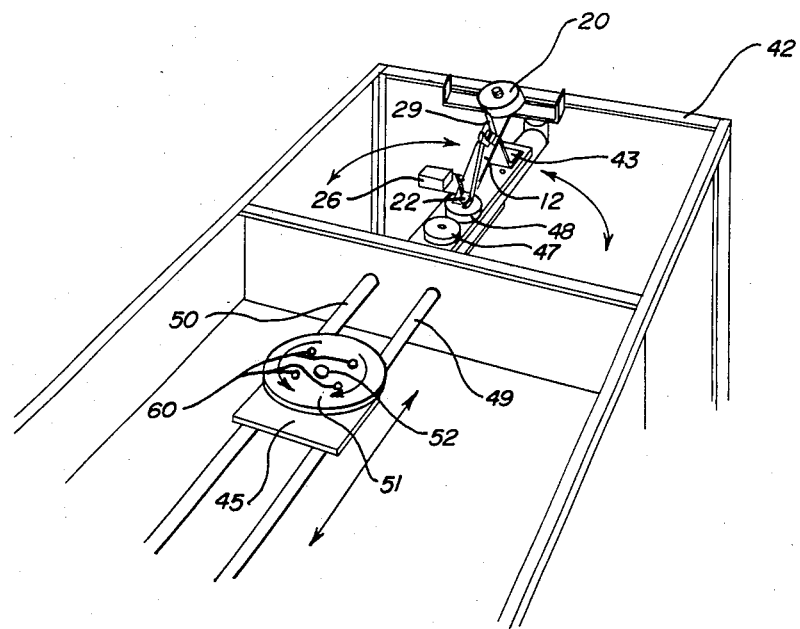
FIG. 5 shows the foil applicator in position on a frame, showing the means upon which a workpiece having a serpentine contoured edge is mounted.
Figure 6:
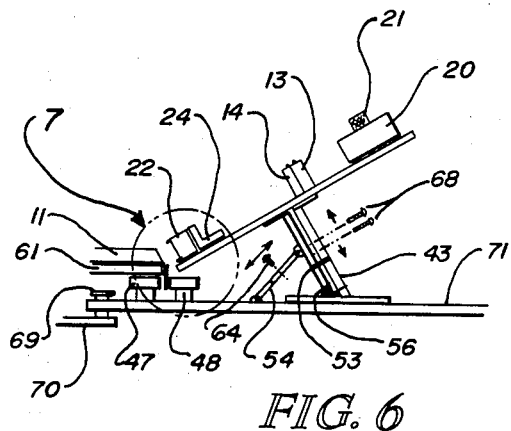
FIG. 6 is an expanded view showing the foil applicator in position on frame 42 of FIG. 5 and in use with a workpiece having a serpentine edge.
Figure 7:
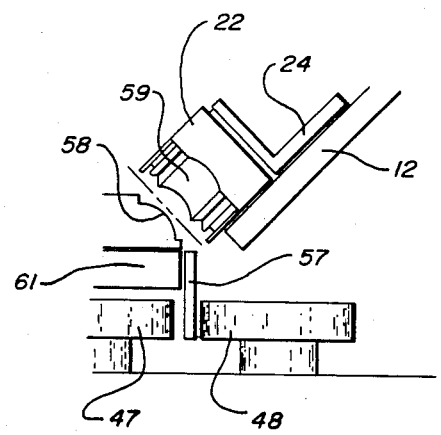
FIG. 7 is an expanded view of the area referred to as "7" in FIG. 6, showing in greater detail the relationship between the transfer block and a workpiece having a serpentine contoured edge with an outer serpentine shape.

Now going to FIGS. 5 through 7 of the drawings: FIG. 7 shows transfer block 22 with a different contoured surface 59, illustrating adaptability to numerous contours. FIG. 5 shows tape applicator mechanism 10 in position on frame 42, ready to apply decorative film of transfer foil 29 to the contoured serpentine edge 58 of workpiece 11. Frame 42 includes bars 49 and 50, to which base plate 45 is slidably attached so that it moves in the direction shown by the arrow in FIG. 5. A rotatable base 51 is pivotally attached to base plate 45 by hollow axle 52. Holes 60 are provided in rotatable base 51 to facilitate attachment of template 61. A vacuum line not shown in the drawings attaches to hollow axle 52 of rotatable base 51, and a hole is drilled in template 61 whereby vacuum is communicated to the bottom surface of workpiece 11, holding it in position against template 61. As workpiece 11 is rotated on rotatable base 51, tape applicator mechanism 10 is free to pivot back and forth as shown by the movement arrows in FIG. 5 on pivot means 69 in order to conform its position to the contoured serpentine edge 58 of workpiece 11. This movement is further illustrated in FIGS. 8 and 9, and is accomplished through the mounting of tape applicator mechanism 10 on bracket 71, which is pivotally attached to bar 70 by pivot means 69. Bar 70 is rigidly attached to frame 42. The angle at which tape applicator mechanism 10 is positioned, and consequently the contoured surface 59 of transfer block 22, is set by supports 43, 53 and 54, and is designed to keep the engaged surface of contoured serpentine edge 58 of workpiece 11 perpendicular to contoured surface 59 of transfer block 22 at all times. This enables the operator to match the contoured surface 59 of transfer block 22 more precisely to the contoured serpentine edge 58 of workpiece 11. Supports 45, 53 and 54 are held in position by screws 64 and 68. Support 53 pivots on pivot means 56 with respect to bracket 71. Template 61 is cut into the shape of workpiece 11 so that the contoured serpentine edge 58 of workpiece 11 matches the edge of template 61. Additionally, a template rim 57 is attached to the edge of template 61 and extends therearound, fully encompassing the edge of template 61. Template rim 57 extends downward from template 61 and is held in position between rollers 47 and 48, which turn during the application of transfer foil 29 to contoured serpentine edge 58. Though not specifically shown in the drawings, rollers 47 and 48 are powered to turn template 61 for application of transfer foil 29, and are also spring-loaded so that they are held tightly against template rim 57 during operation. Rollers 47 and 48 are also driven by a differential gear system to compensate for any differences in rotation as a result of the serpentine shape of template rim 57.

Figure 8:
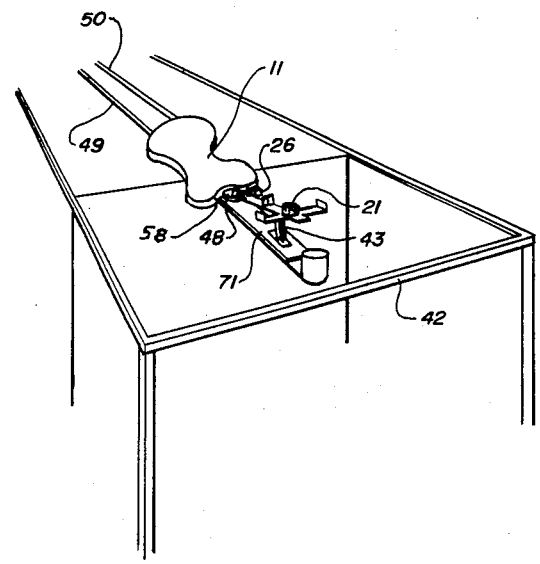
FIGS. 8 and 9 are top views showing the mechanical operation of the foil applicator mechanism with respect to the serpentine edge of a workpiece to which the decorative film is to be applied.
Figure 9:
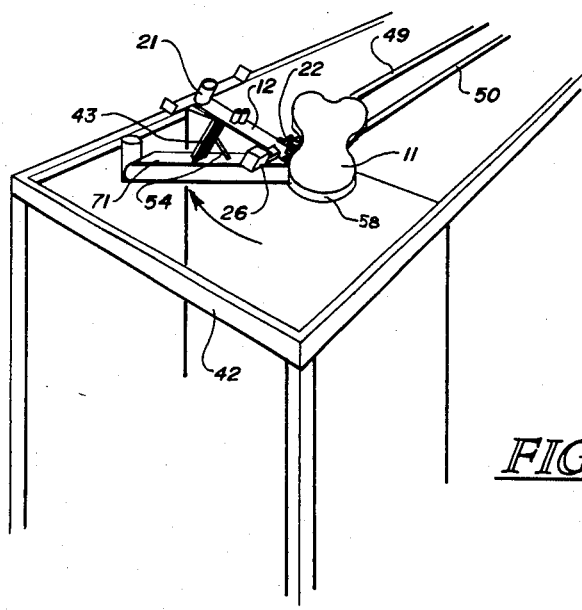

FIGS. 8 and 9 show the mechanical operation of the tape applicator mechanism 10 with respect to a contoured serpentine edge 58 of a workpiece 11 to which decorative film is to be applied. Specifically, in FIG. 8 the workpiece 11 as shown mounted on the template 61 shown in FIG. 6 on rotatable base 51. Because workpiece 11 is of an unusual shape, rim 57 of template 61 is required to hold contoured surface 59 of transfer block 22 in proper position with respect to workpiece 11 at all times. Depening on the contour of the contoured serpentine edge 58 of workpiece 11 to which decorative film is being applied, support 43 is lengthened or shortened to raise or lower tape applicator mechanism 10, thereby enabling the operator to set optimal attitude to maintain the contoured surface 59 of transfer block 22 substantially perpendicular to contoured serpentine edge 58 of workpiece 11. As workpiece 11 is turned, base plate 45 slides back and forth along bars 49 and 50, thereby remaining in close proximity to transfer block 22. In order to follow the contour of contoured serpentine edge 58 of workpiece 11, bracket 71 pivots on pivot means 69 with respect to bar 70, thereby keeping tape applicator mechanism 10 properly oriented with respect to contoured serpentine edge 58 of workpiece 11 at all times to achieve the most effective transfer of the decorative film of tape 29.

Alternatively, a microprocessor-controlled positioning unit could be used to control the angle of the foil applicator to the surface of workpiece 11.

While the foregoing description of the invention has shown preferred embodiments using specific terms, such description is presented for illustrative purposes only. It is applicant's intention that changes and variations may be made without departure from the spirit or scope of the following claims, and this disclosure is not intended to limit applicant's protection in any way.

I claim:

1. A foil applicator capable of applying decorative film from transfer foil to a contoured edge of a workpiece, comprising:
    a base;
    a preformed transfer block substantially rigidly attached to said base having a contoured face with a contour substantially the same as the contour of said contoured edge of said workpiece to which said transfer foil is to be applied;
    heating means for heating said contoured face of said preformed transfer block so that said transfer foil substantially conforms to said contoured face when pulled taut against said contoured face;
    means for routing said transfer foil to said preformed transfer block and over said contoured face of said preformed transfer block;
    tension means for maintaining tension on said transfer foil to ensure that said transfer foil conforms to said contoured face of said preformed transfer block;
    means for transporting said contoured edge of said workpiece past said contoured face of said preformed transfer block;
    a hammer having a contoured surface the contour of which is substantially the same as said contour of said contoured edge of said workpiece and said contour of said contoured face of said preformed transfer block, positioned in close proximity to said preformed transfer block, and
    activating means for pounding said hammer against said transfer foil and said contoured edge of said workpiece
    whereby said decorative film from said transfer foil heated by and conformed to said contour of said contoured face of said preformed transfer block is securely adhered to said contoured edge of said workpiece.

2. The applicator of claim 1, wherein said means for routing said transfer foil over said contoured face of said body includes means for holding a roll of said transfer foil.

3. The applicator of claim 1:
    wherein said means for transporting said contoured edge of said workpiece past said contoured face of said preformed transfer block consists substantially of:
        a rotatable base;
        a template mounted on said base and having a shape which is substantially the same as the shape of said contoured edge of said workpiece, and including a rim extending coextensively with said shape of said template;
        means for mounting said workpiece securely on said template, and
        roller means contacting said rim whereby said template and said workpiece are rotated when said roller means are activated, and
    including pivotal mounting means for mounting said preformed transfer block in close proximity to said contoured edge of said workpiece, so that when said decorative film from said transfer foil is applied to said contoured edge of said workpiece which has a serpentine edge, said preformed transfer block is held in proper orientation to facilitate effective transfer of said decorative film.

* * * * *